June 17, 1930.  W. C. MARTIN  1,764,329
TWO-CYCLE VALVELESS INTERNAL COMBUSTION ENGINE
Filed Aug. 12, 1927   3 Sheets-Sheet 1

W. C. Martin  INVENTOR

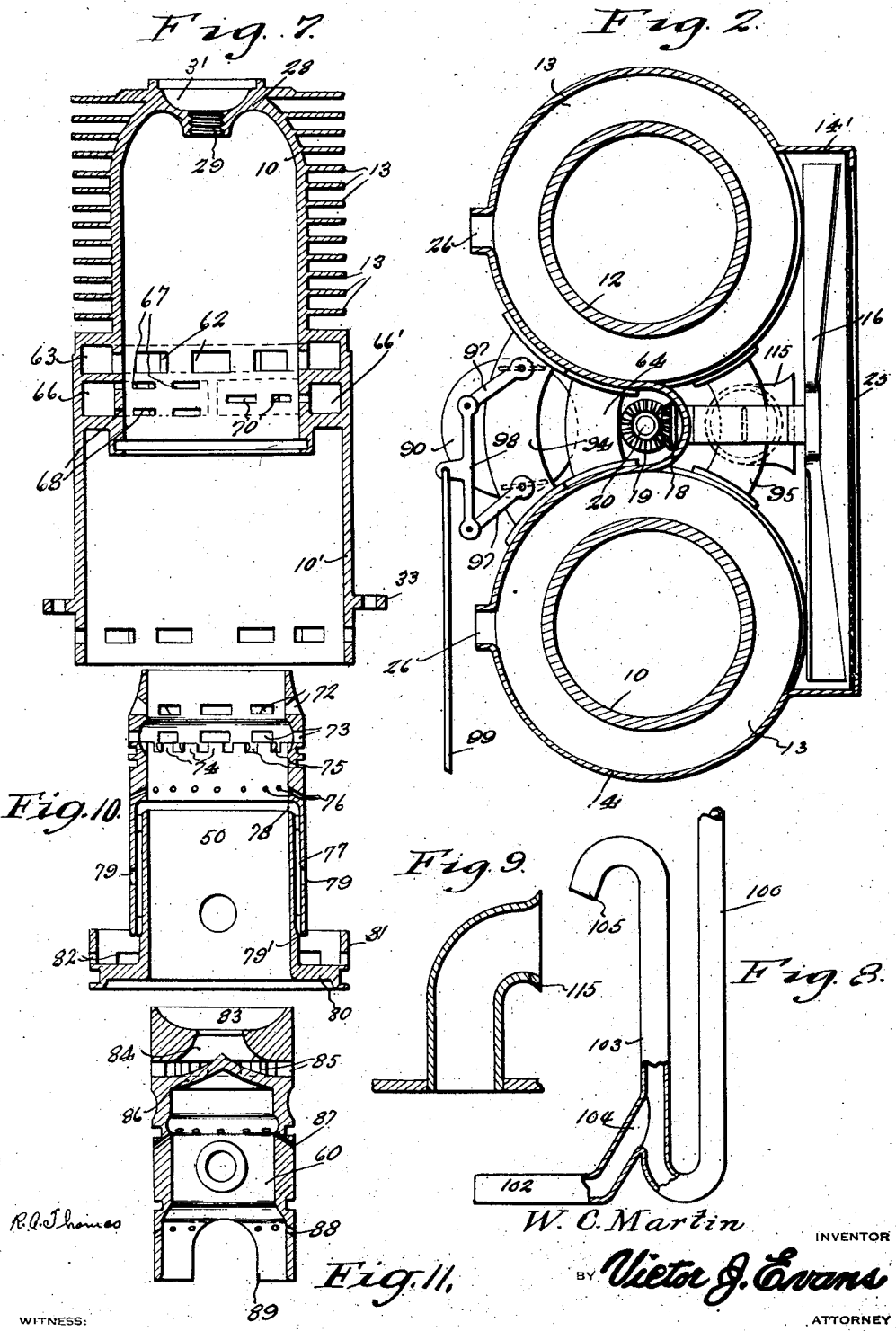

June 17, 1930.  W. C. MARTIN  1,764,329
TWO-CYCLE VALVELESS INTERNAL COMBUSTION ENGINE
Filed Aug. 12, 1927   3 Sheets-Sheet 3
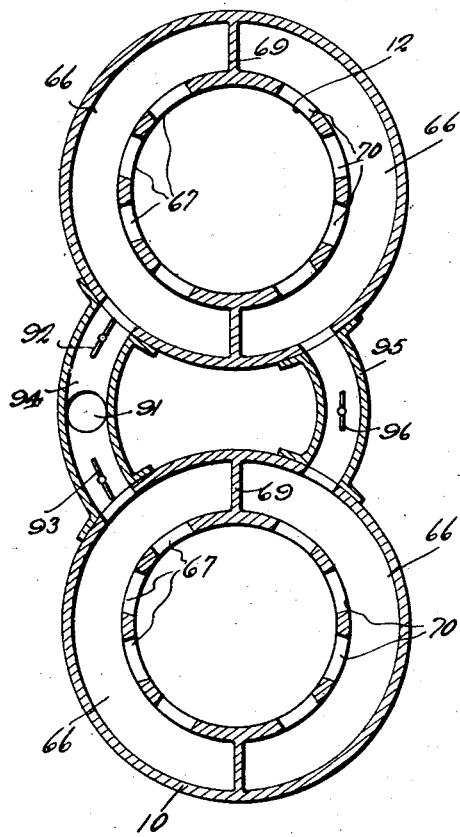
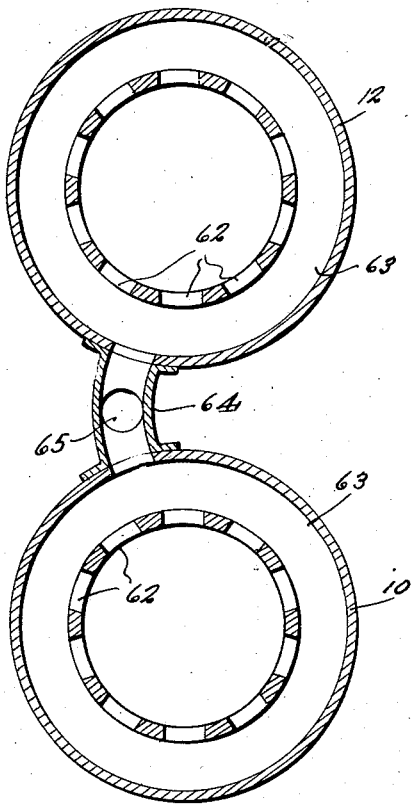
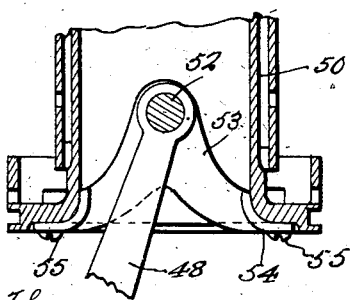
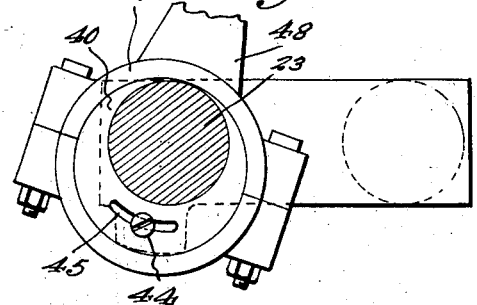
W. C. Martin  INVENTOR
BY *Victor J. Evans*  ATTORNEY
WITNESS:

Patented June 17, 1930

1,764,329

UNITED STATES PATENT OFFICE

WESLEY C. MARTIN, OF DONNELSVILLE, OHIO

TWO-CYCLE VALVELESS INTERNAL-COMBUSTION ENGINE

Application filed August 12, 1927. Serial No. 212,573.

The object of this invention is to provide an internal combustion engine of the type indicated, in which the cylinders each receive two pistons operating concentrically, the inner pistons being directly connected with the crank elements of the crank shaft and the outer pistons being operated by eccentrics carried by said crank elements.

A further object is to provide an engine which may comprise any suitable number of units, each unit consisting of two main cylinders, each provided with two pistons, and each unit being provided with an independent fuel supply, air supply, lubricating means, and cooling means.

A further object is to so operate the four pistons of each unit that air admitted through the crank case will be used for forcing out the burnt gases, and that air passing thru the carbureter and from one cylinder to the opposite cylinder of the unit will combine with the fuel to produce the firing charge, and that air will be introduced into the combustion chamber of each cylinder from the compression chamber thereof for serving as a filler and providing the required degree of compression, this action taking place as the piston moves thru approximately the third quarter of its full upstroke.

A further object is to provide special means for cooling the pistons independently of the means for cooling the cylinders, and to provide for elevating the oil from the bottom of the crank case, under air pressure introduced directly from the pressure chamber of the cylinders into a pipe discharging into a drip receptacle below the crank shaft.

With the foregoing and other objects in view, the invention consists in the novel construction and arrangement of elements hereinafter described, illustrated and claimed, it being understood that modifications may be made within the scope of the claims without departing from the spirit of the invention.

In the drawings forming part of this application,

Figure 2 is a horizontal section on line 2—2 of Figure 1.

Figure 3 is a horizontal section on line 3—3 of Figure 1.

Figure 4 is a horizontal section on line 4—4 of Figure 1.

Figure 5 is a detail view in vertical section showing how the connecting rod for the outer piston is operatively secured to the latter.

Figure 6 is a detail view showing the mounting of one of the eccentrics on the crank shaft.

Figure 7 is a section through one of the cylinders, longitudinally thereof, and including the lower portion adapted to receive the piston of Figure 10.

Figure 8 is a detail view of the pipe thru which oil is elevated under air pressure introduced in the pipe at the right of this view.

Figure 9 shows the breather pipe, to be connected with the crank case.

Figures 10 and 11 are vertical sections through the two pistons described below.

Figure 1:
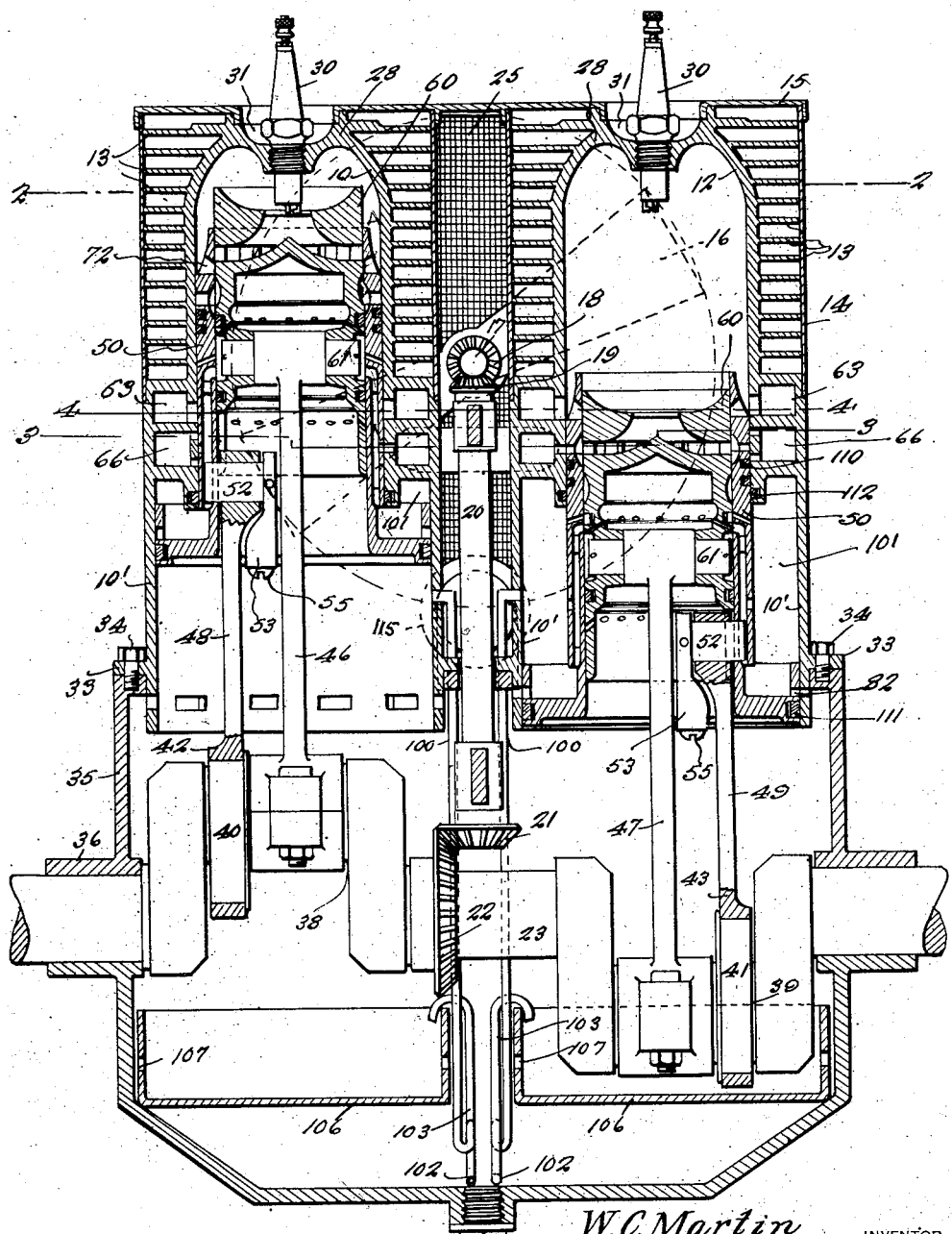
Figure 1 is a view in vertical section thru the engine, or thru one unit of the engine, if more than two main cylinders are employed.

As indicated above, the engine includes two main cylinders, and these are designated 10 and 12, or if a larger engine is to be constructed each unit thereof will include two cylinders such as 10 and 12, with the other elements directly associated therewith for producing a complete operative combination in each unit.

The cylinders carry or have formed thereon fins 13 for facilitating the radiation of heat, and a shell or housing 14 surrounds the elements 13, a cover plate being shown at 15. A fan 16 on the shaft or spindle 17 is driven by a gearing including gear wheels 18 and 19, and wheel 19 is carried by a vertical shaft 20 on the lower end of which is a beveled gear wheel 21 which meshes with beveled gear wheel 22, the latter being mounted on the crank shaft 23. The fan operates within a compartment or the like between the elements 14' of the housing or shell, and a screen 25 serves an obvious purpose. The air currents pass around the cylinders between the elements 13, and outwardly through ports 26.

The cylinders 10 and 12 each include a head 28 having a threaded opening 29 for a spark plug 30, the body portion of the plug entering a concavity 31, in the head.

The cylinders each include a lower portion 10' having a flange 33 for connection by means of bolts 34 with the crank case, designated 35. The crank shaft 23 operates in bearings such as 36 in the walls of the crank case, and each of the crank pins 38 and 39 carries an eccentric such as element 40 or 41 cooperating with the eccentric bands 42 and 43, one of these being shown in detail in Figure 6, and being adjustably mounted by means of screw 44 cooperating with slot 45. The connecting rods 46 and 47 are operated from the crank pins 38 and 39, and the connecting rods 48 and 49 are operated from the eccentrics, these connecting rods controlling separately the pistons shown in the lower part of Figure 7.

The outer piston 50 of each cylinder is controlled by connecting rod 48 or 49, as the case may be, connection being effected by piston pin 52, shown in Figure 5 and in Figure 1, this element entering the wall of the piston and also entering bracket 53 having a segmental base portion flanged at 54 and secured by screws 55.

Inner piston 60 of each cylinder is connected by piston pin 61 with connecting rod 46 or 47, as the case may be.

Referring especially to Figure 7, the upper cylinder or main cylinder, has communication thru exhaust ports 62 with an annular exhaust chamber 63, the chambers of oppositely located cylinders being connected as shown in Figure 4 by a duct 64, and the latter being designed to discharge thru the portion 65 of said duct.

Below exhaust chamber 63 of Figure 7, is an annular chamber 66 with which ports 67 and 68 communicate, at the left of Figure 7, and dividing the chamber 66 from chamber 66' are webs such as 69, shown especially in Figure 3, a single series of ports 70 communicating with this portion of the chamber, or with portion 66' thereof. The ports 70 provide for the intake of fuel, in one cylinder, while air is being admitted to the cylinder thru ports 70 of the other cylinder.

The outer piston 50, shown in the central portion of Figure 7, is provided with two series of ports, designated 72 and 73, and is provided with a series of projections or the like, designated 74 forming intervening spaces 75, for the purpose indicated below. Oil ports 76 permit of the passage of lubricating material.

Outer piston 50 is further provided with an annular chamber 77 in the wall thereof, having its upper opening just below the shoulder 78, and this chamber has lateral ports 79, and is open at its lower end, as shown at 79'. The piston 50 includes a lower outwardly extending flange 80 and an upwardly extending flange 81, ports being provided at 82. The piston 60 includes an upper concave portion 83 communicating with a central aperture leading to chamber 84, lateral ports or openings being provided at 85, just above the head 86. Inner piston 60 is also provided with oil ducts 87 and 88, and the piston is slotted at 89 for the accommodation of pin 52. Piston 60 is of a diameter corresponding with the diameter of the bore, that is the central vertical bore, of the outer piston 50.

In Figures 2 and 3 the head of the needle valve by which fuel is admitted from the carbureter 90, is shown in plan and is designated 91, and the throttle valves 92 and 93 control the flow of air from one cylinder toward the other, thru duct 94, the air taking up the vaporized fuel at this point. Duct 95 is controlled by a valve 96, and air for flushing either cylinder is admitted, from one cylinder to the other, at this point.

The valves 92 and 93 each have connected with their axial member, links such as 97, and these links are connected by suitable pivots with the bar 98 having an offset thereon to which an operating rod 99 is pivotally connected.

In Figure 8, I have illustrated a main feature of construction of the lubricating means, and each unit, comprising two main cylinders, is provided with independent lubricating devices. Within the lower portion of the crank case are drip pans, below the crank elements of the main crank shaft 23, and the pipe connections of Figure 8, are positioned relatively to the drip pan as indicated in Figure 1.

Air pipes 100 admit air pressure from chamber 101 and oil is admitted thru pipe 102 from the lower portion of the crank case, the oil passing into portion 103 of pipe 100 thru port 104, and being discharged under air pressure from said pipe 100 through nozzle or outlet end 105, passing thence into either one of the drip pans 106, positioned below the crank elements. Each pan 106 is provided with a port or with ports such as 107, for determining the oil level within the pan, and reliance is placed on the splash system for the lubrication of the pistons, in an obvious manner, reference having already been made to the oil ports of the pistons. Each piston is channeled annularly for packing rings such as 110, 111, etc., and packing may also be provided at 112.

In operation, as the pistons 50 and 60 near the bottom of their stroke, a strong vacuum is formed in the space 101 between the outer piston 50 and the cylinder wall 10' and as the ports 82 in the lower or large part of outer piston 50 register with the ports in the lower end of the cylinder, air rushes in thru the breather pipe 115 located in the top of the crank case, to fill the vacuum space, thus ventilating the crank case, cooling the oil, carrying along the "oil vapor," moisture etc.

As the pistons start on their up stroke, the ports close and the space 101 contains a supercharge of air. As the pistons move up by the rotation of the crank shaft, this supercharge of air being compressed in space 101, is distributed as follows: First, a small portion is forced thru the air pipe 100, of the oil system, supplying lubrication to the bearings and drip pans 106. Then as the pistons move further up by the rotation of the crank shaft, the intervening spaces 75 within piston 50 are opened by the eccentric 40 or 41 reaching a low point on the crank shaft, thus allowing enough air to pass thru into the combustion chamber of the same cylinder to be used as a filler to give the required compression. This also tends to cool the heated pistons and cylinder walls.

As the pistons near the top of their stroke, the ports 75 close and the balance of the air held under pressure in space 101 is transferred to the other cylinder, of a pair of cylinders, alternately. First, the ports 79 in the outer piston 50 register with ports 68 in the cylinder wall and a portion of the remaining air is transferred thru the space 66', thence thru duct 95, into space 66' of the other cylinder, of a pair of cylinders, alternately, thence thru ports 67 in the cylinder wall and ports 73 in outer piston 50, and ports 85 in piston 60, up thru space 84 in the top of piston 60. From here the air passes upwardly in a solid column, striking the spark plug with considerable force and is deflected by the dome shaped cylinder head 28 following the cylinder walls and goes out the exhaust ports 62, into space 63, duct 64, and is discharged at 65. Thus each cylinder is cleared of all burned gases after each power stroke.

Then as the pistons in cylinder 10, reach the top of their stroke, the pistons in cylinder 12 reach the bottom of their stroke and the balance of the air in space 101 of cylinder 10, is transferred thru ports 70 into space 66, thru duct 94 and past needle valve 91 of the carbureter 90. At this point the air and gas form the combustible mixture, which then passes on thru space 66 of the other cylinder of a pair of cylinders, alternately, thence thru ports 73 and 85, thence thru space 84 in piston 60, thence up in a solid column to the dome shaped cylinder head 28 where it is deflected, the same as the air for flushing and follows the cylinder walls downwardly, thus driving out most of the air used for flushing before the exhaust ports 62 close by the up stroke of piston 50. The piston head 86 is cooled, the cooling effect beginning where the heated effect is otherwise relatively high, and continuing as described.

As the pistons move up, there is nothing in the combustion space but the combustible fuel, which is being heated and thoroughly vaporized by absorbing the heat from the hot pistons and cylinder wall. When the pistons near the top of the stroke, the ports 75 open, by one of the eccentric bands 42 or 43 riding on a low point of its eccentric and the bulk of the air held in space 101 is quickly transferred thru space 77 and ports 75 and 72 into the combustion chamber of the same cylinder. Here it is directed against the cylinder walls, which it follows on all sides of the cylinder, to the dome shaped top, where it is deflected and turned down, thus pressing the heated combustible fuel down into the hollow piston head 84 of piston 60.

It should be understood that when the pistons in cylinder 10 are nearing the top of their stroke, the ports 79 in the outer piston 50 register with the ports 68 in the cylinder wall of the same cylinder, and at the same time the pistons in cylinder 12 are nearing the bottom of their stroke, and the ports 85 in piston 60 and ports 73 in piston 50 register with ports 67 in the cylinder wall of cylinder 12, thus allowing a part of the air that still remains in space 101 to escape thru ports 79 and 68 into space 66' of cylinder 10, thence thru duct 95 into space 66' of cylinder 12, and thru ports 67 in the cylinder wall and ports 73 in piston 50, and ports 85 in piston 60, thru space 84 to the top of the cylinder, then down and out of the exhaust ports 62, duct 64 being discharged at 65.

As the pistons in cylinder 10 reach the top of their stroke and the pistons in cylinder 12 reach the bottom of their stroke, the ports 85 in piston 60 and the ports 73 in piston 50 register with the ports 70 in the cylinder wall of cylinder 12, while ports 79 in piston 50 register with ports 70 in cylinder 10, thus allowing the balance of the air that was being held in space 101 of cylinder 10 to escape thru space 66 and duct 94 into the other cylinder, of a pair of cylinders, alternately, thus carrying the charge of combustible fuel into one cylinder just before the charge is lighted in the other cylinder, of a pair of cylinders, alternately.

The fuel being thus heated by contact with the heated head of the small piston, does not easily mix with the incoming air in the small fraction of a second before the sparking is produced.

The ports 67, 68 close as a relatively high part of eccentric 40 or 41 becomes effective, and the pistons move upwardly to complete the compression. The spark plug enters the upper open end of the small piston, and the combustible fuel passes around the spark plug and mixes with the air. The charge is fired in the presence of a full supply of oxygen, burning rapidly and causing quick expansion, thereby producing a maximum power stroke.

At the instant the sparking takes place, ports 72 in piston 50 register with ports 85 of the inner piston, by movement of the eccentric 40 or 41 to a still higher point, allowing the lighted portion of the charge to mix with the air on all sides as well as the top. These steps are produced or take place during one revolution of the crank shaft, constituting two cycles or strokes of the concentric pistons.

It should be stated that one object of employing eccentrics 40 and 41 is that they may be caused to produce a lagging action for holding the intake ports open longer than under usual conditions, that is in a two cycle engine having single pistons.

As the inner piston starts on its upstroke, the eccentric is passing the center, at the bottom, and the outer piston lags behind, for holding the intake ports open longer, as just indicated, and said outer piston continues to lag behind until the ports 75 between the two pistons open, and the air to be used as a filler, being compressed in chamber 101, passes thru to the combustion chamber.

The eccentric 40 or 41 then causes the outer piston to speed up, thus quickly closing ports 75 and forcing the balance of the air under compression in space 101, thru the passages leading to the opposite cylinder for clearing it of burnt gases, and supplying air for the combustible fuel.

The same operation takes place on the down stroke or power stroke, the outer piston lagging behind until the exhaust ports are reached, when it speeds up and goes ahead of the inner piston, thus opening the exhaust ports quickly.

The cylinders are not entirely filled with gaseous fuel as in the usual motor or engine, but a body of combustible fuel is used and the balance of the cylinder is filled with pure air necessary for complete combustion, this air filler giving the necessary compression pressure in the cylinder.

The air pressure is constant, but the compression, speed and power can be varied by a variable fuel supply, controlled by the throttle valve or valves.

The air cooling system differs from that commonly used, because it cools the pistons and cylinders both inside and outside, and the unnecessary heat is attacked or reduced at the point or points where it is being generated. The usual practice is to attempt to draw off the heat thru the cylinder wall by water circulation, and it is my aim to produce a more effective operation in the manner above indicated.

Claims:

1. In a two cycle engine, a plurality of cylinders, a crank shaft, a plurality of pistons for each cylinder, means for operating the pistons one within the other and each independently of the other, from the crank shaft, the pistons of the respective cylinders imparting thrust simultaneously under explosive force to the same element of the crank shaft, means for admitting air to one of the cylinders for compression by one of the pistons therein, means for transmitting the air to the other cylinder for flushing the latter, means for admitting fuel under air pressure to each cylinder, means for admitting air to each cylinder during the latter part of each compression stroke, for producing increased compression of the charge, and means for firing the charge.

2. In a two cycle engine, a plurality of cylinders, a crank shaft, concentrically mounted pistons for each cylinder, means for operating the pistons one within the other and each independently of the other, from the crank shaft, the pistons of the respective cylinders imparting thrust simultaneously under explosive force to the same element of the crank shaft, means for admitting air to one of the cylinders for compression by one of the pistons therein, means for transmitting the air to the other cylinder for flushing the latter, means for admitting fuel under air pressure to each cylinder, means for admitting air to each cylinder during the latter part of each compression stroke, for producing increased compression of the charge, and means for firing the charge.

3. In a two cycle engine, a plurality of cylinders, a crank shaft, a plurality of air cooled pistons for each cylinder, means for operating the pistons one within the other and each independently of the other, from the crank shaft, means for admitting air to one of the cylinders for compression by one of the pistons therein, means for transmitting the air to the other cylinder for flushing the latter, means for admitting fuel under air pressure to each cylinder, means for admitting air to each cylinder during the latter part of each compression stroke, for producing increased compression of the charge, and means for firing the charge.

4. In a two cycle engine, a plurality of cylinders, a crank shaft, a plurality of pistons for each cylinder, one of the pistons being open thru the top, and the other having a head including an open chamber therein, means for operating the pistons one within the other and each independently of the other, from the crank shaft, means for admitting air to one of the cylinders, for compression by one of the pistons, means for transmitting air to the other cylinder for flushing the latter, means for admitting fuel under air pressure to each cylinder, and means for admitting air to each cylinder during the latter part of each compression stroke, for producing increased compression of each charge, and means for firing the charge against the heads of both pistons of the respective cylinders, these pistons imparting thrust to the crank shaft.

In testimony whereof I affix my signature.

WESLEY C. MARTIN.